Dec. 17, 1940.　　　　P. H. KECK　　　　2,225,056
COUNTERPRESSURE VALVE FOR LIQUIDS
Filed Sept. 15, 1938　　　2 Sheets-Sheet 1

Inventor
Paul H. Keck
John F Brezina
Atty.

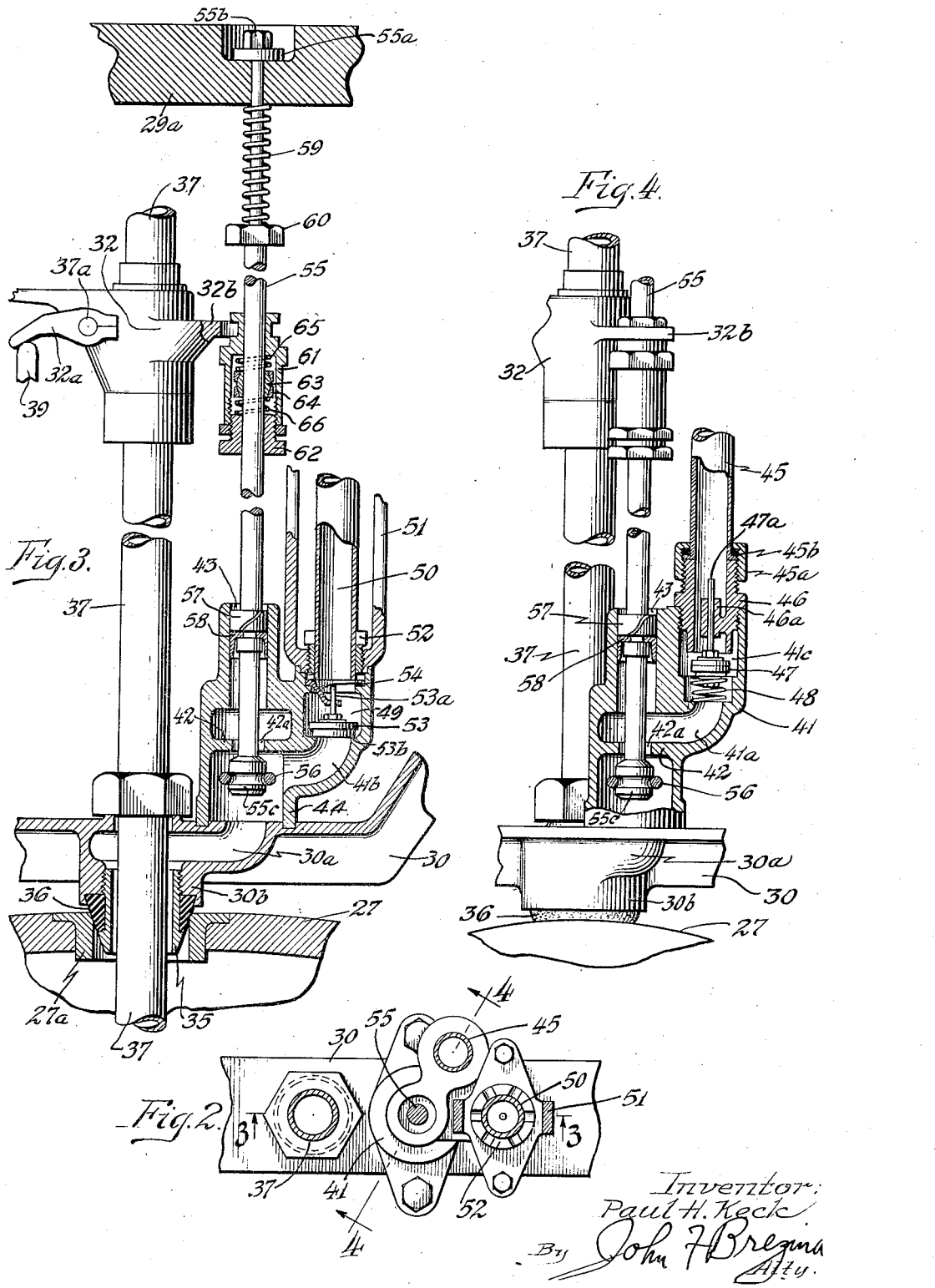

Patented Dec. 17, 1940

2,225,056

UNITED STATES PATENT OFFICE 2,225,056

COUNTERPRESSURE VALVE FOR LIQUIDS

Paul H. Keck, Chicago, Ill., assignor to Louis Monninger and Richard Wasserman, both of Chicago, Ill.

Application September 15, 1938, Serial No. 229,996

8 Claims. (Cl. 226—110)

This invention relates to a novel valve construction and means associated therewith and with essential parts of a beer racking machine which is adapted to permit quick, practical and easy means and method for intermittently building up a counter air pressure in the barrel, keg or other container to be filled, and for permitting gradual return to the racker tank of the air from the container being filled, at the same time always maintaining an equalized pressure in the unfilled and gradually smaller portion of the container. Said novel valve means, mechanism and method further provide for return to the racker tank of the overflow or excess beer which passes through the beer filling tube after the barrel or other container is completely full, all without waste of beer or of loss of air pressure.

Because of the special peculiarities of beer, and its great propensity toward foaming when agitated or passed over rough and circuitous surfaces, and because beer, when expelled from a container into a vessel open to the atmosphere, will foam excessively into such an extent as would make practically impossible the economical filling of barrels and kegs, it is important and necessary that a counter air pressure be quickly and inexpensively built up within a keg whose opening has been sealed from the outside atmosphere. Secondly, it is also necessary and indispensable that automatic and manually controllable means and devices be provided, not only to maintain the pressure within a sealed keg being filled until the keg is completely full of liquid beer, but also to provide a return passage for the excess or overflow of beer because it is impossible to shut off the flow of rapidly inrushing beer at the very instant the keg is full, and further it is impossible for the operator to know when the keg is full by observation of the keg itself as the interior is completely sealed.

My invention has for its object the provision of inexpensive and practical mechanism for fully and satisfactorily solving these problems which are peculiar to the filling of beer containers, and more particularly, to provide manually controllable means for communicating the upper portion of the beer racker tank and the interior of the keg whose opening has been sealed by the sealing head of the beer racker arm, in order that the air pressure within the keg to be filled is built up substantially equal to that in the upper part of the racker tank. A further object of my invention is to provide a novel return valve construction which has a manually controlled communication with the aforesaid air inlet means and also with the interior of the keg to be filled whereby the air may escape back into the racker tank according to the rise of the liquid body within the keg and also whereby the excess beer introduced into the keg through a racker filling tube will return through a valve passage back into the upper portion of the racker tank without loss or waste.

A further object of my invention is the provision of a novel valve construction of the type illustrated in the drawings and which is associated and cooperable with the swingable arm of the beer racking machine for filling kegs or barrels with beer and which has a plurality of compartments or passageways therethrough, one of said passageways being an air inlet and another of said passageways being an air and beer return outlet passageway whereby the air and beer may be returned from the barrel or keg to the racker tank, in combination with manually controllable valve means for selectively and intermittently operating valve mechanism to permit air inflow into the container and automatically closable check valve to prevent the return of air or excess beer through the inlet passages thereof and to force the same through the proper return passages to the racker tank.

A further object of my invention is the provision of a novel construction or valve mechanisms in combination with means for selectively introducing compressed air from a racker tank to the interior of a container to be filled with beer, having automatically closable valve means to prevent further introduction of air during the filling operation and after the air pressure in the container has been equalized, and further, which provides valved means and passageways communicating with the interior of the container to be filled and with the interior of the racker tank whereby expelled air and excess beer may be returned to the racker tank without loss or waste.

Other and further important objects of my invention will be apparent from the following description and claims.

On the drawings:

Fig. 2 is an enlarged fragmentary and cross-sectional view looking from above toward the lower portion of the slidable frame and novel valve mechanism.

Fig. 3 is a partially side elevational view and partial cross-sectional view of the valve mechanism and portion of the cross member of the slidable frame and taken on line 3—3 of Fig. 2.

Fig. 4 is a partially cross-sectional view on a vertical plane of the return valve and valve mechanism taken on line 4—4 of Fig. 2.

As shown on the drawings:

Figure 1:
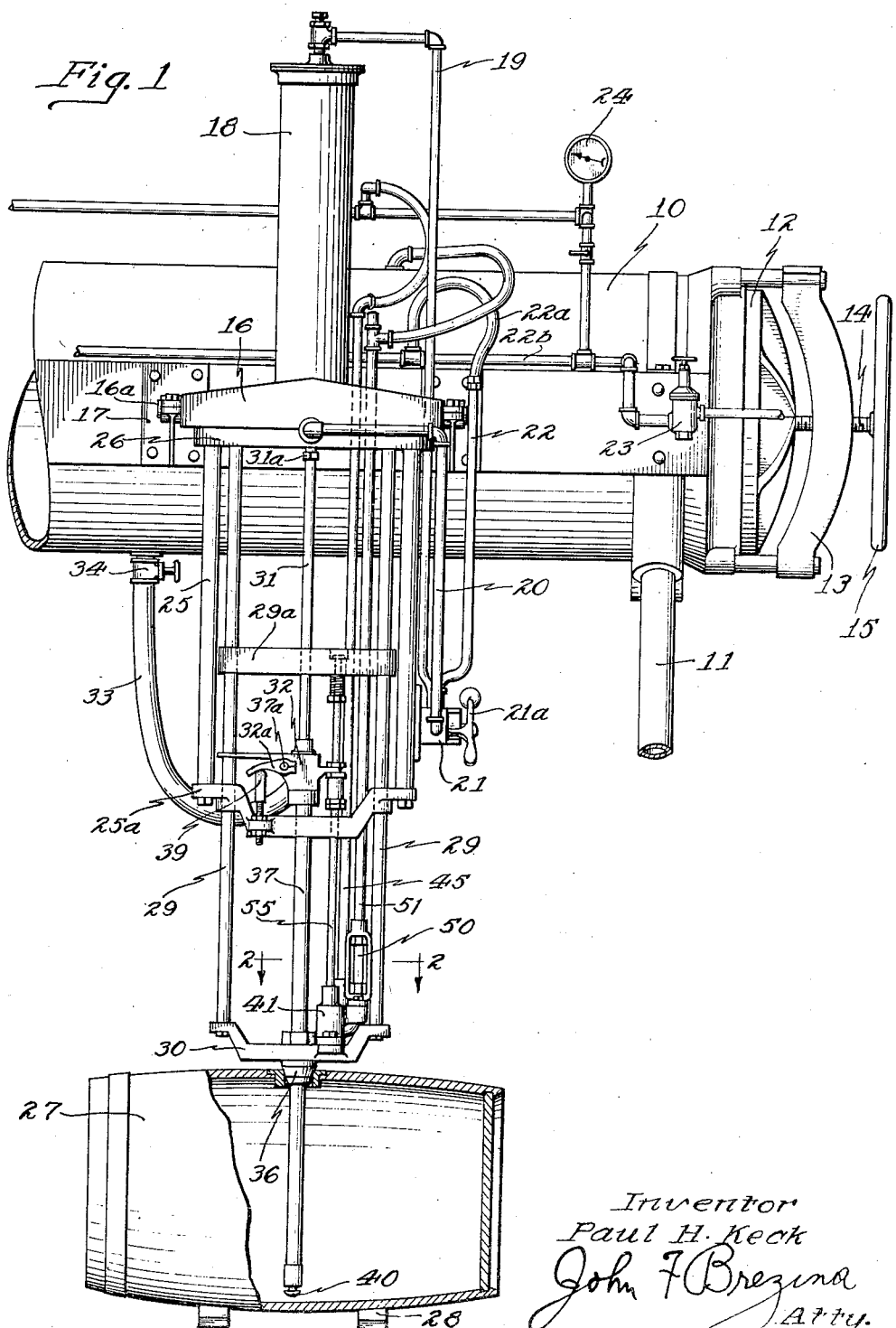
Fig. 1 is a front elevational view with parts broken away of a racking machine embodying my invention, and illustrating a keg or barrel in position for filling, and showing the exterior of the novel valve and passage means and mechanism of my invention.

Reference numeral 10 designates a racker tank, which is usually cylindrical and mounted in substantially horizontal position and normally supported by a plurality of standards, one of which standards 11 is illustrated at the lower right of the drawings. The racker tank has an open end closable by a cover plate 12 which is adapted to be removably held in sealing engagement by means of a cross bar 13 and a screw 14 operated by hand wheel 15, this permitting convenient access for frequent cleaning of the interior of the tank.

In this specification wherever the word "racker" or "racking machine" is referred to, it is understood to mean the complete machine such as illustrated in part in the drawings, it being understood that beer racking machines for filling kegs and barrels are provided with from one to four filling arms, each arm comprising all the structural parts which are illustrated in Fig. 1 other than the tank, its supporting standards, air inlet pipes and removable ends.

Each of said "arms" of the racking machine is swingably and pivotally mounted to swing both forward and backward as well as in transverse direction by means of a trunnion arm 16 and a centrally fulcrumed and pivoted cross arm 26, the lower portion of which is shown, said trunnion arm 16 having its integral opposite end studs 16a pivotally journalled in suitable bearings formed on said brackets 17. A compressed air cylinder 18 is mounted at its lower end on the upper surface of said trunnion arm, and has its opposite ends connected respectively by the compressed air conduits 19 and 20, conduit 20 passing through the forward portion of the trunnion arm and communicating with the interior of said cylinder 18. The opposite ends of said air conduit are suitably connected to the housing of the operating valve 21. Numeral 22 represents the compressed air inlet conduit which is connected at its lower end with the housing of the operating valve 21 as indicated in Fig. 1, and at its upper end is connected by a flexible hose connection 22a to the longitudinally extending air supply pipe 22b. The air supply pipe 22b is connected to a suitable source of compressed air, the same having a regulating valve 23 interposed therein for manually adjustable control, and also preferably being connected with an air pressure indicator 24 to permit observation of air pressure being maintained.

The substantially rectangular frame 25 includes the two substantially parallel vertically extending bars or rods which are secured at their upper ends to the pivotally and swingably mounted plate 26 by suitably threaded nuts. The pivotal plate or cross arm 26 is provided at its center with horizontally extending studs which project from the forward and from the rear sides thereof and which studs are supported upon an inwardly projecting member (not shown) of the trunnion plate 16, this permitting rocking and pivotal movement of the frame and suspended parts from side to side. As before stated, the trunnion plate or arm 16 is provided at its ends with studs 16a which are journaled in the two spaced apart brackets 17. The lower end of said bars or rods 25 are threadingly connected to opposite apertured ends of an angular downwardly offset yoke 25a. It is to be noted that the frame 25 and the parts supported thereby are swingable both forwardly and rearwardly as well as transversely of the operator viewing the machine, this permitting any desired positioning thereof so as to quickly mount the device for sealing keg 27 which is temporarily held by anti-roll supporting means 28.

Slidably mounted in and upon the racking frame 25 is a rectangular rack which is composed of a pair of spaced apart parallel bars 29 connected together at a point substantially below their upper ends by a cross bar 29a and at their lower ends by an irregular metal apertured and passaged yoke or connecting cross arm 30, the lower ends of said rods 29 being suitably secured in suitable apertures in the opposite ends respectively of said lower cross arm 30.

The lower portions of the parallel bars 29 of said slidable rack are slidably journalled in the correspondingly spaced apertures formed in the connecting yoke 25a of the suspended frame 25, and the upper ends of said parallel bars 29 are slidably mounted in suitable correspondingly spaced apertures formed in the fulcrumed pivotally mounted cross arm 26, each of said bars having a suitable stop nut (not shown) to limit the desired movement of said rack.

Mounted within the air cylinder 18 is a suitable piston (not shown) to which one end of the connecting rod 31 is connected, said connecting rod extending through a suitable packing box 31a adjacent the lower end of the cylinder and downwardly through an aperture in the connecting yoke 25a and in threading engagement at its lower end with the correspondingly threaded upper portion of the housing of the filling head 32 which has a rear side inlet opening (not shown) defined by a suitable pipe fitting (not shown) to which the lower end of the flexible hose 33 is connected. The upper end of said hose 33 is connected to the outlet side of a suitable hand operated valve 34 which in turn is communicatively connected to the outlet port in the bottom of the racker tank 10, as shown at the left of Fig. 1.

As illustrated in Fig. 3, which shows a fragment of the connecting cross arm 30, said cross arm has a relatively large right angled passageway 30a therethrough which opens upwardly and the lower opening of which is suitably threaded for the reception of the bung sealing means which comprises a threaded nipple fitting 35 having yieldable rubber washer or sealing gasket 36 mounted thereon. It is to be noted that an integral boss or annular lip 30b formed integral with the lower cross arm 30 extends downwardly and is internally threaded to provide convenient mounting for said bung seal. Numeral 37 designates a filling tube whose upper end is securely mounted in the lower outlet opening of the filling head housing 32. The filling head housing has a suitable passage therethrough connecting the inlet which communicates at one end with the inlet of the beer inlet hose 33. Mounted within the housing of the filling head 32 are a pair of levers which are operated by and connected to a transversely extending stub shaft 37a which is journalled in the wall of the housing of filling head 32 and the end of which is shown in Fig. 1. Mounted on the outer end of said stub shaft 37a is a lever 32a which is adapted to be moved in vertical and arcuate position upon engagement thereof by the upper end of an adjustable set screw 39 whose lower end is threadingly mounted in a suitable aperture formed in the connecting yoke 25a as illustrated in Fig. 1. The interior levers within the housing of filling head 32 (which are not shown) are connected to a conical filling tube valve 40 at the lower end of the filling tube 37 by means of the connecting rod (not shown).

When the lever 21a (Fig. 1) of the hand operated hand valve is operated to a certain position to permit escape of the air from within the cylinder 18 and beneath the piston, the rack which is slidably mounted by means of the bars 29 is permitted to descend by gravity, the operator guiding same so that the bung sealing means comprising the nipple 35 and sealing gasket 36 fits into the conventional bushing 27a of a barrel or keg 27 which has been rolled upon and mounted upon the temporary supporting means 28.

Referring to the drawings, particularly Fig. 3, numeral 41 designates an irregular substantially U-shaped casing or housing which is formed with an angular inlet passage 41a and an air and beer return outlet passage 41b which are separated over a portion of their lengths by an integral baffle or partition 42 which has a substantially central aperture formed therein. Said housing also has a third cylindrical vertically extending chamber 43 whose lower end is coincident with the central aperture 42a formed in the partition wall 42. The lower end of said housing is formed with an integral annular lip 44 which defines a portion of the lower passage through said housing and which is securely mounted over the upper opening of the passage 30a formed in the cross arm 30.

An air inlet conduit 45, which is connected at its upper end with the top of the racker tank has its lower end communicatively connected to the inlet opening of the chamber or passage 41a by means of a threaded passaged fitting 46 which is securely connected at its upper end to said air inlet pipe 45 by means of a bushing 45a and a suitable sealing ring 45b. The lower end of said threaded fitting 46 is threaded in the correspondingly threaded enlarged portion of the valve chamber 41c which forms a continuation of the chamber or passage 41a, and forms an angular shoulder at the junctures thereof. A check valve 47 is mounted for vertical movement by means of a suitable stem 47a which is slidable in an apertured inwardly extending portion 46a of the fitting 46. Said valve 47 is adapted to seat against the lower end of the fitting 46, and is normally held in closed position by means of a coil spring 48 whose lower end is seated on the right angled shoulder formed at the juncture of chamber or passage 41a and the valve chamber 41c.

Numeral 49 designates an enlarged chamber within the housing 41 which forms an upper continuation of the passage 41b of the air and beer outlet and return passage 41b. Said valve chamber 49 is communicatively connected with the upper part of the beer racker tank by suitable conduit 50a in which is interposed a tubular observing glass 50. The observing glass 50 is suitably mounted in communication with said chamber 49 by means of the metal observing glass frame 51, a suitable packing nut 52 forming the connecting, sealing and mounting means therebetween. Numeral 50a designates the conduit leading up from observation glass 50 to the top of the tank.

Mounted within the valve chamber 49 is an annular gravity valve 53 which is slidably mounted for vertical movement by means of a central stem 53a which is vertically movable in a suitable aperture formed in an angular bracket arm 54 mounted in the upper portion of the chamber 49. The valve 53 is adapted to seat upon a right angled shoulder 53b which is formed at the inlet entrance to said valve chamber and at the juncture thereof with the return passage 41b.

Referring further to Fig. 3, numeral 55 designates a valve rod which is mounted for vertical movement as indicated, the upper end thereof being slidable in a suitable aperture formed in the cross bar 29a and having on its upper end a suitable washer 55a and threaded nut 55b. The lower end of said valve rod extends downwardly through the cylindrical chamber 43 of the housing 41 and terminates at its lower end in an enlarged portion 55c on which is mounted a yieldable sealing ring 56. An annular packing nut 57 which slides within chamber 43 normally holds suitable packing 58 against a suitable annular shoulder as shown on valve rod 55 to provide slidable sealing means therefor. A compressible coil spring 59 is mounted about the upper end of said rod 55 and said rod has its upper end slidably mounted in an aperture extending vertically through the cross bar 29a which serves as a counter balance. Said upper end of rod 55 carries a washer 55a and an adjusting threaded nut 55b, and also has mounted thereon below the spring 59 a stop collar 60. The adjusting nut 55b is adjusted so that when the valve rod 55 is moved to uppermost position and the aperture 42a is closed, the rod 55 will not be drawn upwardly to create an excessive tension upon the gasket 56. This excessive and undue tension which can be avoided is brought about through the fact that the upper surface of the chuck housing contacts the thrust or suitable collar 60 which thrust or suitable collar is slidably mounted upon the reduced upper portion of the valve rod 55, and when said thrust or slidable collar 60 is so contacted, said thrust or slidable collar compresses spring 59, thereby permitting the chuck to move upwardly a short distance without putting undue strain upon the valve rod 55, permitting sufficient downward movement of the valve ring 56 and sufficient opening of aperture or port 42a.

Referring to the upper portion of Fig. 3, the reference numeral 61 designates a cylindrical shell or housing of a valve actuator device which has a central longitudinal passage slidably mounted on the valve rod 55, the lower end of said shell or housing 61 being closed by a suitable bushing 62 which is threaded thereinto and which likewise has a central passage slidable on valve rod 55. Mounted within said actuator housing 61 is a ring-like annular friction chuck 63 which has its sides beveled in opposite directions and which fits substantially snugly on the valve rod 55. A pair of metal rings 64 are mounted about the opposite edges of said friction chuck, and upper and lower metal coil springs 65 and 66 are mounted on opposite ends of said friction chuck 63 between the end surface of the housing 61 and the end surface of the bushing 62, as clearly shown in Fig. 3.

The upper projecting end of the actuator housing 61 is reduced and formed with an annular groove in which is mounted the bifurcated end of the horizontally extending arm 32b of the filling head. Upward or downward vertical movement of the filling head causes the vertical movement to be transmitted to the actuator housing 61, and in turn transmitted through either of the opposite end springs 65, 66 to the chuck 63. It is to be noted that while the filling head moves a substantial distance in either direction, especially downwardly, the valve rod 55 is to be moved only a limited distance to open the valve ring 56. As soon as the valve rod 55 has moved the desired distance to open the valve 56 the friction chuck 63, which is preferably made of Babbitt metal, will slide along the valve rod 55. When the beer head 32 moves up, it likewise moves upward the valve rod 55 to close valve 56, the spring 59 normally holding said valve in tightly closed position.

The usual operation is as follows:

The racker tank, being connected by suitable pipe with the source of power through which the power is driven by means of pumps and under pressure, is normally maintained with a central depth of from six to sixteen inches of beer. Air compression means is connected with the air inlet pipe 22b, the air passing through the regulating valve 23, through communication pipes 22b and into the top of the tank, air pressure within the tank being normally maintained at about twenty pounds per square inch. When a keg is rolled and positioned upon the temporary supporting means 28 with its bung hole opening upwardly the operator operates the lever 21a of the operating valve 21 to permit gravity descent of the rack defined by bars 29 and cross arm 30, the operator guiding the rack so that the gasket or sealing ring 36 fits tightly within the bung hole as illustrated in Fig. 3. After the aforesaid rack has descended, as the bung seal has been made, the operator then operates the valve lever 21 to cause compressed air to enter the cylinder 18 at the top through conduit 19 to cause descent of the piston rod 31, beer head 32 and filling tube 37 to substantially the position illustrated in Fig. 3. As frame 25 descends to lowermost position as stated, the filling tube 37 and beer head 32 are still in upper elevated position. Upon downward movement of beer head 32, the horizontally extending arm 32a which is pivoted with respect to the housing of the filling beer head 32 engages set screw 39 and causes desired downward movement of the valve rod (not shown) to open valve 40 to thereby open the outlet in the tube end. As the beer head 32 begins its descent, a horizontally extending bifurcated arm 32b causes downward movement of the rod actuator housing 61 to in turn cause the metal friction chuck 63 to lower the valve rod 55 against the normal action of the coil spring 59 to cause opening of the valve 56, this permitting immediate inflow of compressed air from the top of the racker tank to the keg 27, the air continuing to flow through the opening 42a, through passage 30a and through the circular passage between the nipple 35 and the filling tube 37 and into the keg. As soon as the air pressure within the keg is equal to that in the upper portion of the racker tank, the action of spring 48 will move valve 47 upwardly to close the same.

The opening of the valve 40 causes the beer from the racker tank (which has an air pressure above its surface) to flow into the barrel, and as the barrel continues to fill it correspondingly pushes the air within the barrel back outwardly through the passage 30a, through the valve chamber 49 and past the valve 53 which is opened by the said returning air and upwardly through the observing glass 50 and through conduit 50 to a point or level in the same plane with the level of the beer in the racker tank. The returning compressed air is prevented from returning back through the inlet means beforedescribed due to the fact that the valve 47 is closed as beforedescribed. As the beer continues to flow into the keg through the filling tube 37 the surplus or excess beer, the keg having been filled, will flow and return through the passages 30a, 41b, through valve chamber 49, and upwardly through the observation glass 50 and into conduit 50a to a level equal to the beer level in the racker tank. As soon as the operator observes the flow of beer through the observing glass 50, he operates the valve lever 21a to introduce air into lower end of the cylinder 18 to elevate the slidable rack, the beer filling tube 37 and beer head 32. As the beer head 32 is elevated a short distance the lever 32a disengages stud bolt 39 to cause immediate closing of valve 40 to shut off the inflow of beer. The aforesaid raising of the piston and likewise the vertical movable rack defined by the bars 29 and cross arm 30 causes the bung sealing means and the filling tube to be elevated and removed from the keg whereupon the "pivotal arm" will swing rearwardly and away from the operator to permit free and convenient access to the bung hole. The operator then drives a suitable bung or other plug into the keg or barrel opening and rolls the keg away for a repetition of the operation.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. In combination with a beer racking machine having a beer pressure tank and inlet and outlet connections therefrom, a counterpressure valve construction communicatively connected to said tank and comprising an irregular metal casing, the interior of which is divided into upper and lower compartments, said compartments having communicating passages and valve chambers, an air conduit communicatively connecting the upper portion of said beer pressure tank and the upper compartment of said valve casing; an air inlet check valve in said upper compartment; a spring for closing said air inlet check valve; a valve rod mounted for vertical sliding movement in said casing; an air outlet valve on the lower end of said valve rod and adapted to open and close the outlet passage of said upper compartment; a return outlet valve in the upper portion of the lower casing compartment, and manually actuable means for operating said valve rod to open and close said air outlet valve, the opening of said air outlet valve being adapted to permit introduction of air into a container to be filled, a slidably mounted beer head, a beer conduit connecting the lower portion of the tank and said beer head, a beer filling tube connected at its upper end with said beer head, a valve in said filling tube adapted to be open when said tube is inserted in a container, and the excess air impelled liquid introduced into the container after filling thereof being adapted to pass through said lower valve compartment and rise in said air return conduit to a level equal to the beer level in said tank.

2. In combination with a liquid receptacle filling machine having a liquid tank, a vertically slidable beer filling tube, and valved conduit means connecting said filling tube and said pressure tank; a substantially U-shaped valve casing divided into a plurality of passages and having a lower opening, one of said passages being an air inlet and another a return outlet; air conducting pipes connecting the air inlet passage of said valve casing and said tank; liquid conducting pipes connecting the return outlet passage of said valve casing and the upper portion of said liquid tank; a check valve in said air inlet pipe; an outlet valve in said return passage of said casing; manually operable valve means for opening and closing the communication between the air inlet passage of said casing and the beer return passage thereof; means for communicating the lower opening of said valve casing and a receptacle to be filled, the opening of said air outlet valve being adapted to permit building up of the air pressure in the receptacle to be filled, the air expelled from said receptacle during the filling operation being adapted to return through the return outlet passage of said counterpressure valve to said tank.

3. In a counterpressure valve construction for selectively introducing compressed air and beer into a receptacle sealed against the atmosphere, a beer tank, a slidably mounted beer filling tube; a flexible conduit connecting said tank and said beer filling tube; a metal valve casing having an upper air inlet compartment; an upper air and liquid outlet compartment in said metal valve casing and a lower compartment in said metal valve casing adapted to be communicatively connected with the interior of the receptacle to be filled; a conduit connecting said outlet compartment and the upper parts of said tank; an apertured partition between said air inlet compartment and said lower compartment; a manually actuable valve in said partition aperture; an air inlet check valve in the air inlet compartment; spring means for normally closing said air inlet check valve; a gravity outlet valve in the air and beer outlet compartment of said casing, the filling of a container being adapted to expel the air through said air outlet compartment to the beer tank and to pass the excess liquid through the upper outlet compartment of said metal valve casing, said excess liquid being adapted to rise in said conduit which connects said outlet compartment and the top of the tank to a level not higher than the beer level in the tank.

4. In combination with a beer racking machine having a liquid tank and air pressure means connected therewith, a filling tube and manually operable valve means associated with said filling tube and connected to said tank; a counterpressure valve for selectively introducing compressed air from said tank to a receptacle to be filled and for returning the air to said tank comprising an irregularly shaped metal casing including an air inlet passage, and a lower chamber and a return passage adapted to be communicatively connected with the receptacle; an air inlet check valve in said air inlet passage; an air and liquid outlet valve in said return passage; a partition wall between said air inlet passage and said air and liquid outlet passage; manually actuable valve means for selectively communicating said passages and said chamber; and conduit means connecting said air inlet passage and said air and liquid outlet passage with the upper portion of said tank, the opening of said manually actuable air outlet valve permitting introduction of compressed air into a container to be filled and said chamber and lower passage providing means for returning air to said tank.

5. In combination with a beer racking machine having an air and beer tank with inlet and outlet connections and means for selectively maintaining air pressure in said tank; a swingably mounted filling arm having a vertically movable filling tube adapted to be inserted into a barrel opening, valve control means for said filling tube; a vertically movable frame including a cross-yoke having a passage therethrough; barrel opening sealing means on said yoke communicating with said yoke passage; a counterpressure and return valve construction including a metal housing defining a plurality of passages therethrough, one of said passages forming an inlet for the air and communicating with the top of said tank; a check valve in said inlet passage; another of said passages being an outlet passage communicating with the top of said tank, a gravity valve in said outlet passage; a manually controllable air valve between said air inlet passage and said outlet passage, the opening of said manually controllable air valve permitting air pressure to be created in the barrel being filled, said return valve permitting return of air into the racker tank.

6. In a machine of the described class having a beer tank and means for filling beer barrels or the like by air pressure means, means for sealing the barrel inlet aperture against the outside atmosphere; means for conducting air from said beer tank through said inlet sealing means into a barrel; a check valve in said air conducting means; means for returning air to said tank; an outlet and return valve in said return means; an apertured partition between said inlet and said return means; a valve in said partition aperture; and manually operable means for controlling said valve, the opening whereof permits air inflow into the barrel to a pressure equal to that within the tank, the expulsion of air from within the container returning through said air return means to said tank.

7. In a machine of the described class having a beer tank and means for filling beer barrels or the like by air pressure means, a slidably mounted frame construction, means mounted on said frame construction for sealing the barrel inlet aperture against the outside atmosphere; a slidably mounted filling tube, a slidably mounted beer head, said filling tube communicating with said beer head, a valve in said filling tube, means on said beer head for operating said valve of said filling tube; means for conducting beer from said beer tank through said beer head and said filling tube and into a barrel; a check valve in said air conducting means; means for returning air to said beer tank; an outlet and return valve in said air return means; and means for operating said air check valve, the opening whereof permits air inflow into the barrel to a pressure equal to that within the tank, the expulsion of air from within the container returning through said air returning means to said tank, and the excess beer being adapted to rise in said air return means to a level not above the level of the beer in the tank.

8. In a beer racking machine having a beer and air pressure tank, a swingable pivotal arm and a beer filling tube mounted for vertical movement, beer conducting means between said tank and said filling tube, means for temporarily sealing the bung hole of a keg, a balanced pressure valve comprising a metal housing having an apertured partition to form a pair of passages therein, one of said passages being an air inlet passage; an air conduit forming communication between said tank and said air inlet; means for communicatively connecting said bung sealing means and said air inlet and outlet valve passages; a manually operable valve for introducing compressed air into said valve housing partition aperture to permit intermittent introduction of air to a container to be filled to create a counterpressure therein; a spring-pressed check valve in said inlet passage; and a gravity valve in said outlet passage adapted to permit return of the air to said tank.

PAUL H. KECK.